(12) United States Patent
Newman

(10) Patent No.: US 6,898,983 B2
(45) Date of Patent: May 31, 2005

(54) MECHANICAL MULTIPLIER FOR A STRAIN GAGE ON A DERRICK

(75) Inventor: Frederic M. Newman, Midland, TX (US)

(73) Assignee: Key Energy Services, Inc., Midland, TX (US)

( * ) Notice: Subject to any disclaimer, the term of this patent is extended or adjusted under 35 U.S.C. 154(b) by 130 days.

(21) Appl. No.: 10/292,715

(22) Filed: Nov. 12, 2002

(65) Prior Publication Data

US 2004/0089076 A1 May 13, 2004

(51) Int. Cl.⁷ .................................................. G01L 1/00
(52) U.S. Cl. ..................................................... 73/782
(58) Field of Search .......................... 73/782, 781, 760

(56) References Cited

U.S. PATENT DOCUMENTS

| | | | |
|---|---|---|---|
| 4,258,566 A | * | 3/1981 | Decker et al. .......... 73/862.381 |
| 4,434,971 A | | 3/1984 | Cordrey |
| 4,534,228 A | * | 8/1985 | Burbank, Jr. .......... 73/862.454 |
| 4,624,450 A | | 11/1986 | Christison |
| 4,752,012 A | | 6/1988 | Juergens |
| 5,039,028 A | | 8/1991 | Svedlund et al. |
| 5,263,597 A | | 11/1993 | Stewart et al. |
| 5,662,311 A | * | 9/1997 | Waedekin et al. .......... 254/273 |
| 5,713,422 A | | 2/1998 | Dhindsa |
| 6,029,951 A | * | 2/2000 | Guggari ...................... 254/269 |
| 6,276,449 B1 | | 8/2001 | Newman |
| 6,547,016 B2 | * | 4/2003 | Wassell ................... 73/152.46 |

* cited by examiner

Primary Examiner—Edward Lefkowitz
Assistant Examiner—T Miller
(74) Attorney, Agent, or Firm—Howrey Simon Arnold & White, LLP

(57) ABSTRACT

A strain gage apparatus for measuring the load applied to a derrick leg mechanically multiplies the deflection or distortion of a strain gage. The apparatus attaches to the derrick leg at two points that are spaced about five feet apart. Accumulated strain along the five-foot section moves one end of an elongate member a significant distance. The distance is much greater than any localized movement or minute strain in the derrick leg. The movement of the elongate member stresses a reaction member upon which the strain gage is mounted.

27 Claims, 8 Drawing Sheets

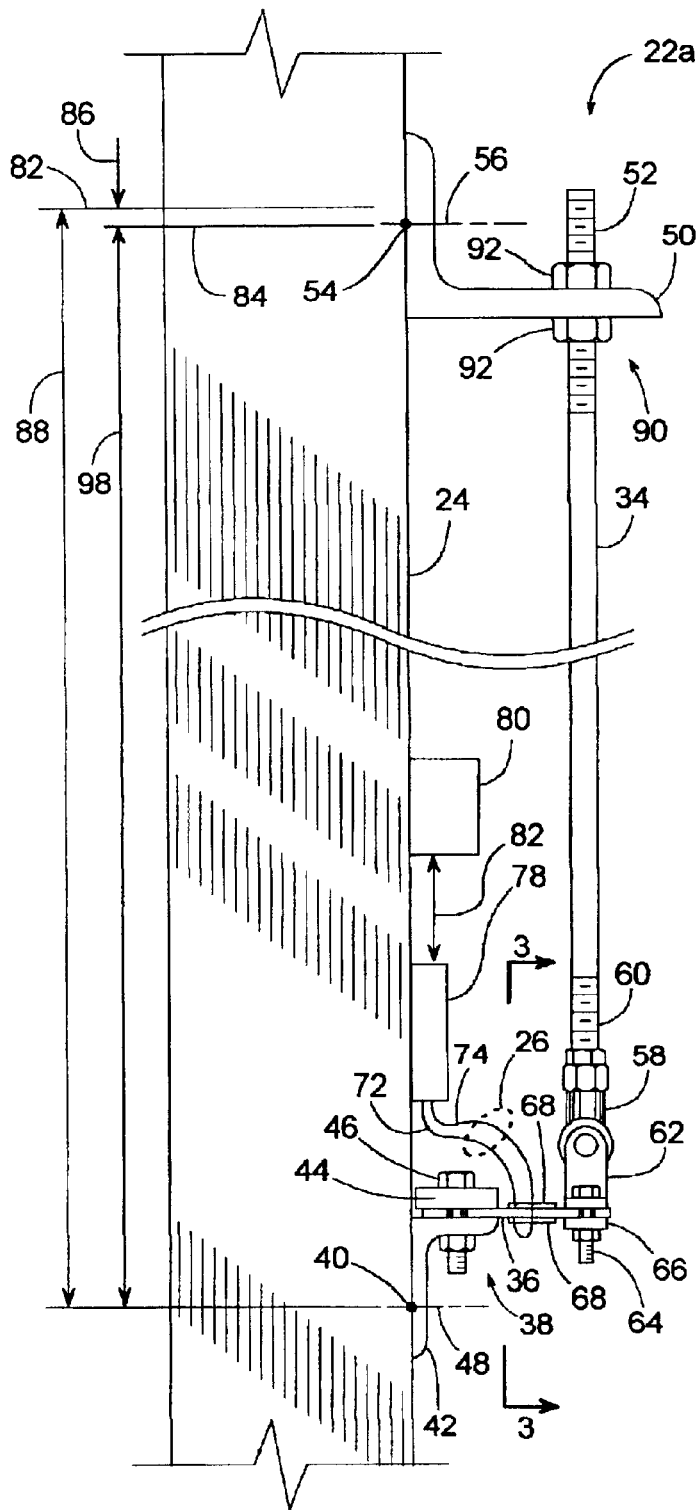
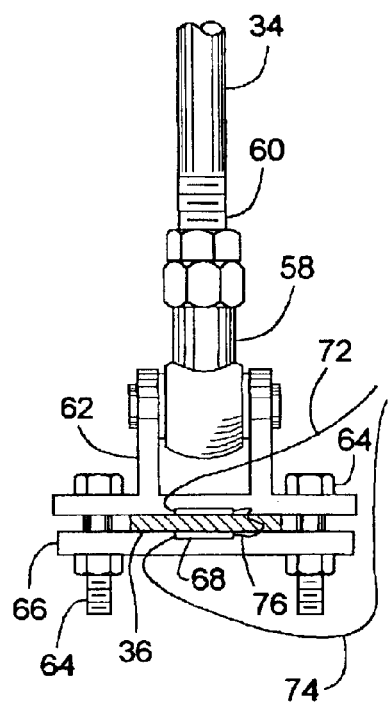
FIG. 2
FIG. 3

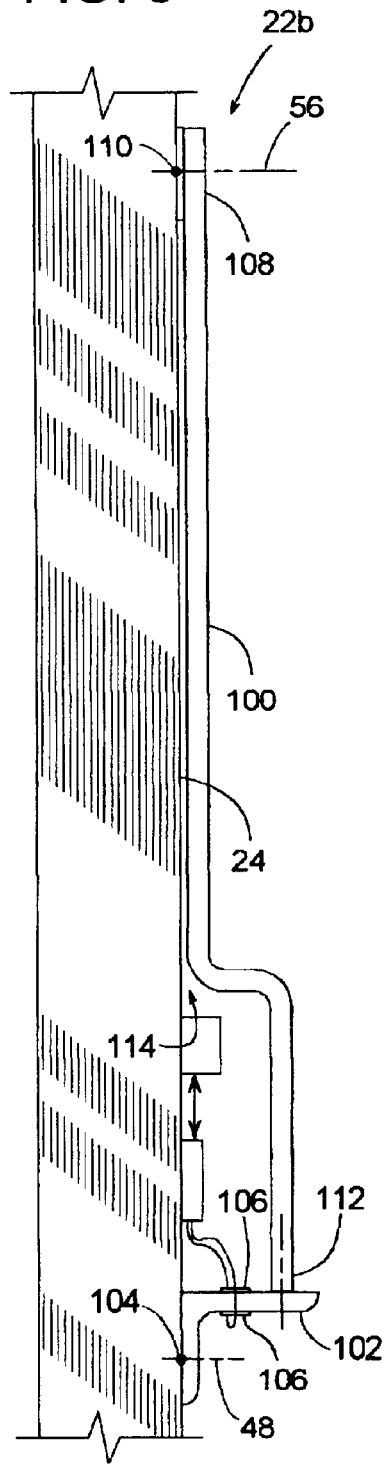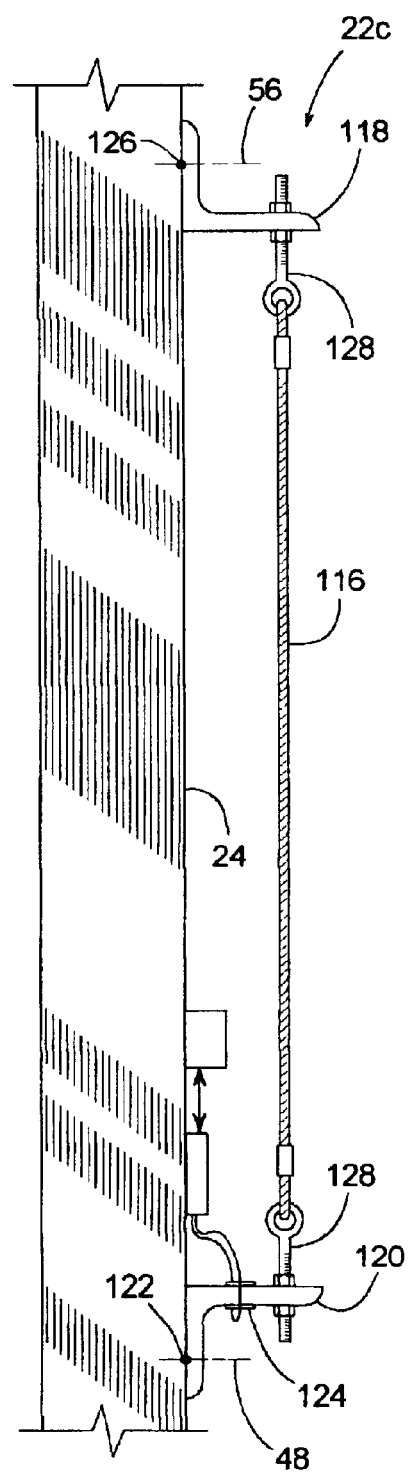

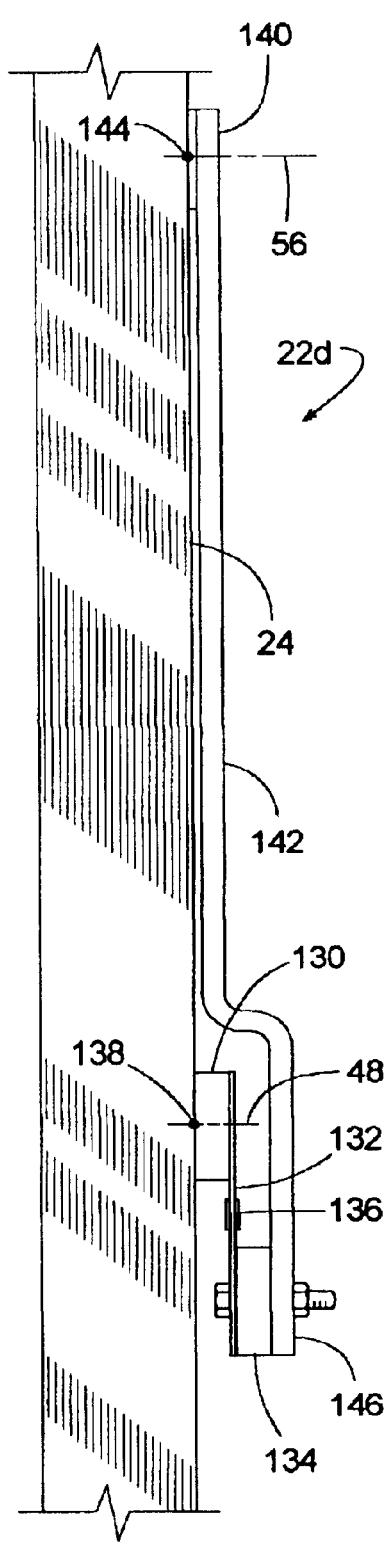
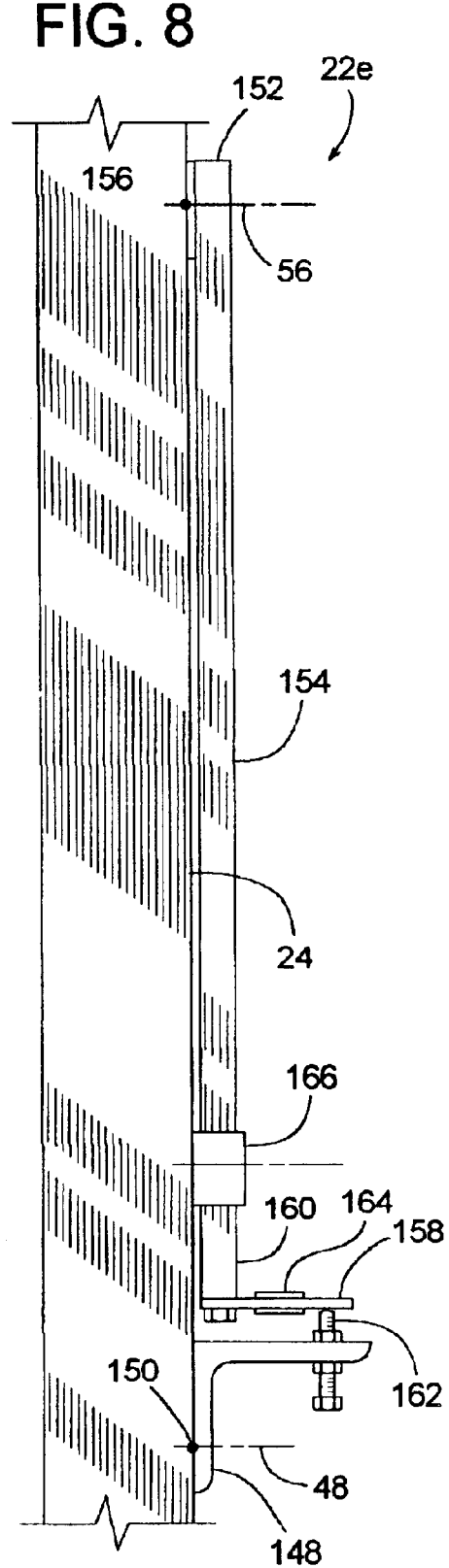

FIG. 12
FIG. 13
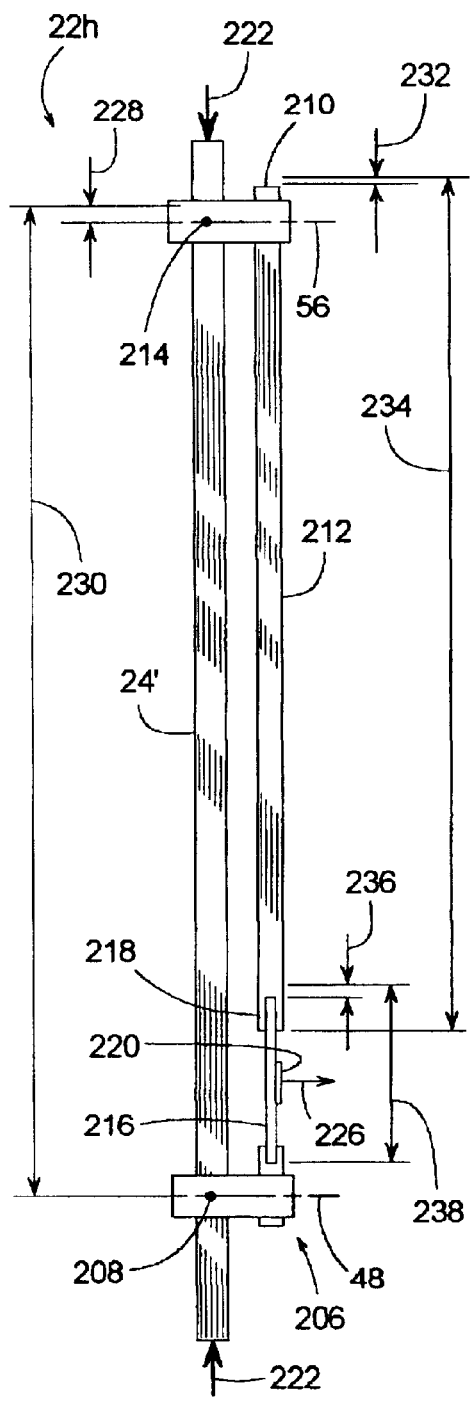
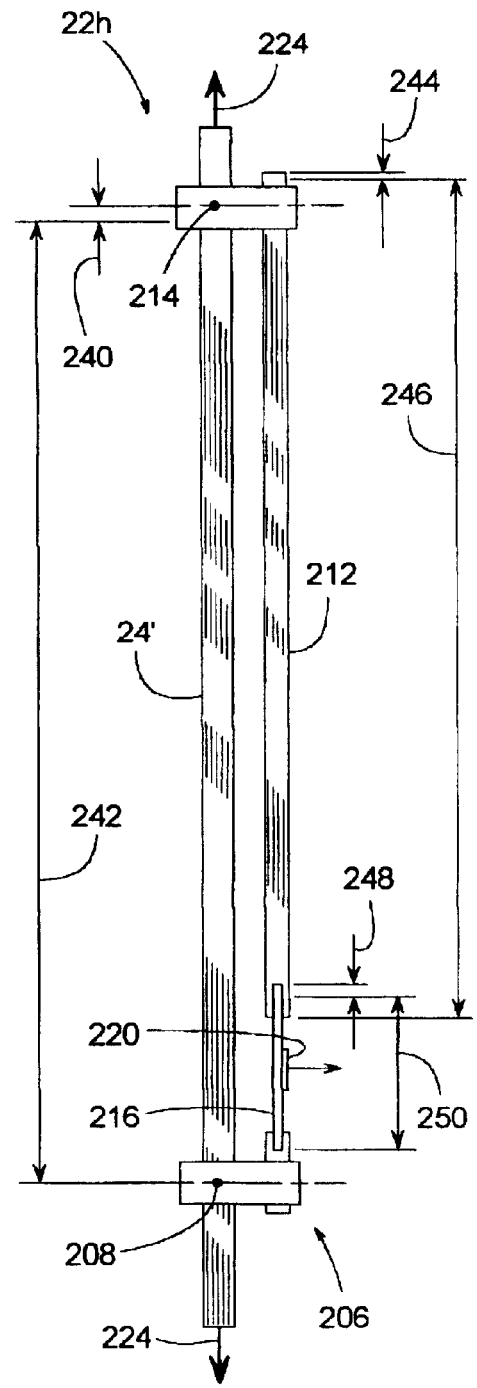

US 6,898,983 B2

MECHANICAL MULTIPLIER FOR A STRAIN GAGE ON A DERRICK

BACKGROUND OF THE INVENTION

1. Field of the Invention

The subject invention generally pertains to a derrick of a hoist and more specifically to an apparatus for sensing a load applied to the derrick.

2. Description of Related Art

Hoist and derrick systems used for drilling or servicing wells often handle loads ranging from about a hundred pounds for lighter well components, such as sucker rods, to a hundred tons or more for a string of well casings.

The load on the derrick is usually monitored in some way to avoid applying excessive lifting force that may damage well components and to avoid overloading the hoist and derrick.

The accuracy of the load measurement is preferably sufficient to differentiate 200 pounds of load. Such accuracy, however, can be difficult to achieve for a common derrick having a rated hook load of 200,000 pounds and having a designed ultimate strength of over 400,000 pounds, considering a safety factor of at least two. 200 pounds is a mere 0.05% of a 400,000-pound derrick, so loads varying by 200 pounds may be difficult to differentiate using conventional means. Consequently, a need exists for an improved, more accurate device for sensing the load on a derrick.

SUMMARY OF THE INVENTION

To provide an improved, more accurate device for sensing the load on a derrick, an object of the invention is to provide a device that creates mechanically multiplied strain changes that can be sensed by a strain gage.

Another object of some embodiments is to attach a strain gage apparatus to a derrick leg, wherein strain changes in the apparatus are greater than corresponding strain changes in the derrick leg.

Another object of some embodiments is to provide a strain gage apparatus for a derrick leg, wherein the strain in the apparatus is greater than the strain in the derrick leg.

Another object of some embodiments is to provide a strain gage apparatus for a derrick leg, wherein the strain in the apparatus is less than the strain in the derrick leg.

Another object of some embodiments is to provide a stain gage apparatus that include two strain gages mounted to opposite faces of a reaction member, wherein the signals from the two gages are combined to provide a combined signal that varies with the load applied to the derrick.

Another object of some embodiments is to provide a strain gage reaction member that is thinner than a bar that actuates the reaction member.

Another object of some embodiments is to mechanically multiply the action of a strain gage by applying the strain gage to a reaction member that lies at an angle to a derrick leg.

Another object of some embodiments is to stress a strain gage with a bar having a distal end that can slide or otherwise move relative to a derrick leg.

Another object of some embodiments is to provide a strain gage apparatus with an adjustment that can adjust the extent to which a bar can stress a strain gage.

One or more of these and other objects of the invention are provided by a strain gage apparatus that includes a strain gage attached to a reaction member, which is stressed by a bar attached to a derrick leg, wherein some relative movement may occur between the bar and the derrick leg.

BRIEF DESCRIPTION OF THE DRAWING

FIG. 2 is a side view of one embodiment of a strain gage apparatus.

FIG. 3 is a cross-sectional view taken along line 3—3 of FIG. 2.

FIG. 5 is similar to FIG. 2 but showing another embodiment of a strain gage apparatus.

FIG. 6 is similar to FIG. 2 but showing another embodiment of a strain gage apparatus.

FIG. 7 is similar to FIG. 2 but showing another embodiment of a strain gage apparatus.

FIG. 8 is similar to FIG. 2 but showing another embodiment of a strain gage apparatus.

FIG. 12 is a schematic view showing how a strain gage apparatus can be applied to a wide variety of structures in compression.

FIG. 13 is a schematic view showing how a strain gage apparatus can be applied to a wide variety of structures in tension.

DESCRIPTION OF THE PREFERRED EMBODIMENT

Figure 1:
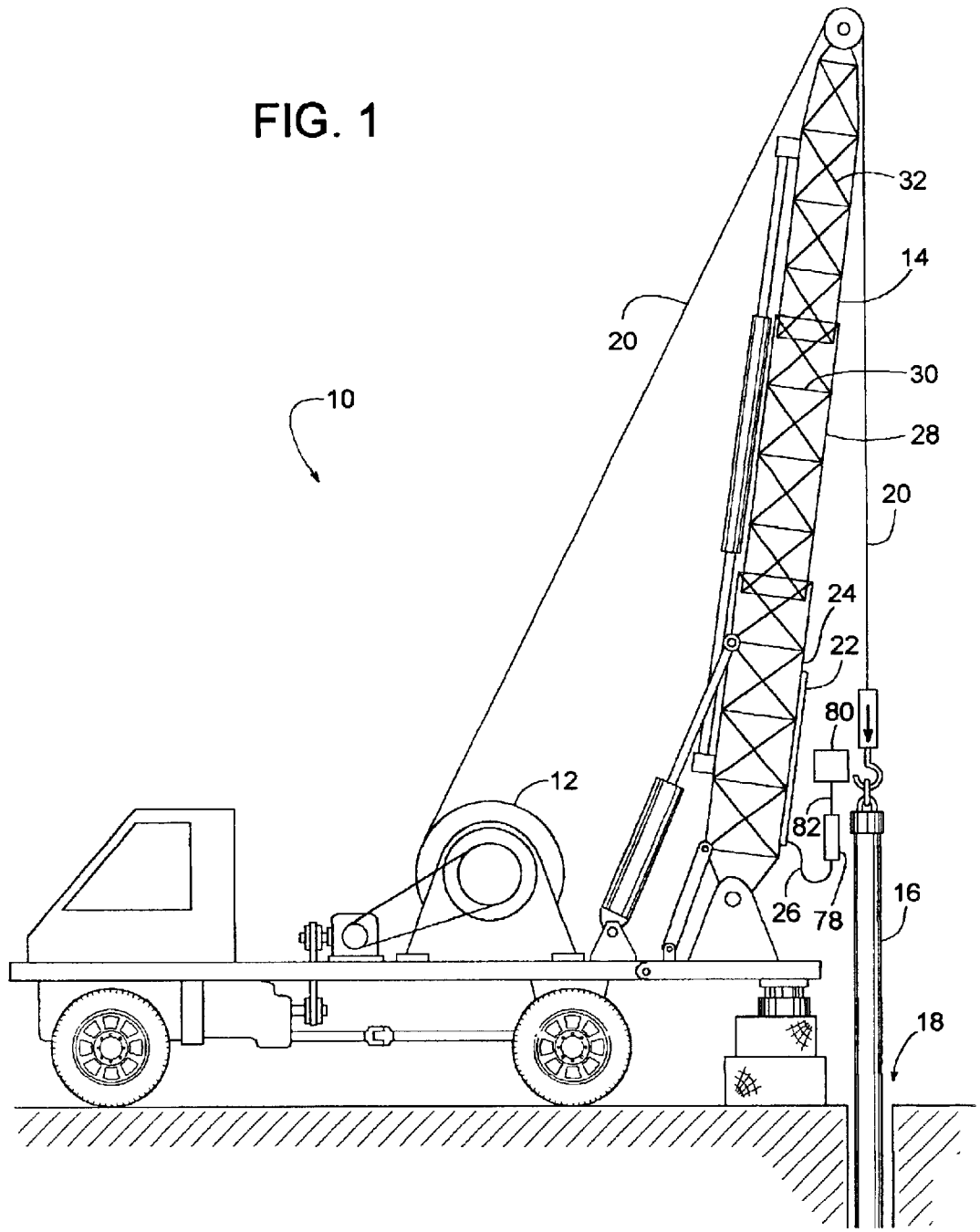
FIG. 1 is a schematic view of a strain gage apparatus attached to a derrick leg of a mobile service rig.

A machine 10 (e.g., a mobile service rig, well drilling rig, crane, etc.), shown in FIG. 1, includes a hoist 12 and a derrick 14 for suspending a load 16 within or above a wellbore 18. Load 16 is schematically illustrated to represent anything that can create tension in a cable 20 of hoist 12. Examples of load 16 include, but are not limited to, tubing, suction rods, casings, and friction of such parts within wellbore 18. Load 16' may vary in magnitude due to acceleration and deceleration of the suspended load or due to frictional changes within the wellbore.

To monitor the magnitude of load 16, a strain gage apparatus 22 is attached to a derrick leg 24 of derrick 14. Load 16 creates a load strain in derrick leg 24, and strain gage apparatus 22 responds to that load strain by providing a load signal 26 that varies with the load strain or magnitude of load 16. The term, "load strain" refers to a change in length over a given reference length of derrick leg 24. Since the actual load strain is not necessarily uniform across the entire length of derrick leg 24, the term "average load strain" may be used, which is the mean load strain distributed across a major length (e.g., length 88) of derrick leg 24. The term, "derrick leg" refers to any elongate member that provides a derrick with structural support that helps in carrying a suspended load. Examples of a derrick leg include, but are not limited to, a generally upright member 28 under compression, a generally horizontal member 30 in tension, a diagonal member 32, and various combinations thereof Derrick 14 can be disposed at an angle, as shown, or can be perfectly vertical.

In addition to load 16, the weight of derrick 14 itself may contribute to the total load strain in derrick leg 24, so the derrick's weight may overshadow small changes in the magnitude of load 16. Moreover, applying a relatively light load to a derrick designed to withstand much larger loads may produce a load strain that is too small to accurately measure using conventional strain gage techniques. So, strain gage apparatus 22 and various similar embodiments (apparatuses 22a–g) provide a mechanically amplified strain that may be easier to detect. The amplified strain in strain gage apparatus 22 may actually be greater or less than the load strain in derrick leg 24. However, small changes in the magnitude of load 16 preferably creates a change in the amplified strain, i.e., delta amplified strain, that is greater than the corresponding change in the load strain, i.e., delta load strain or average delta load strain. There are various ways of achieving such a response.

Figure 4:
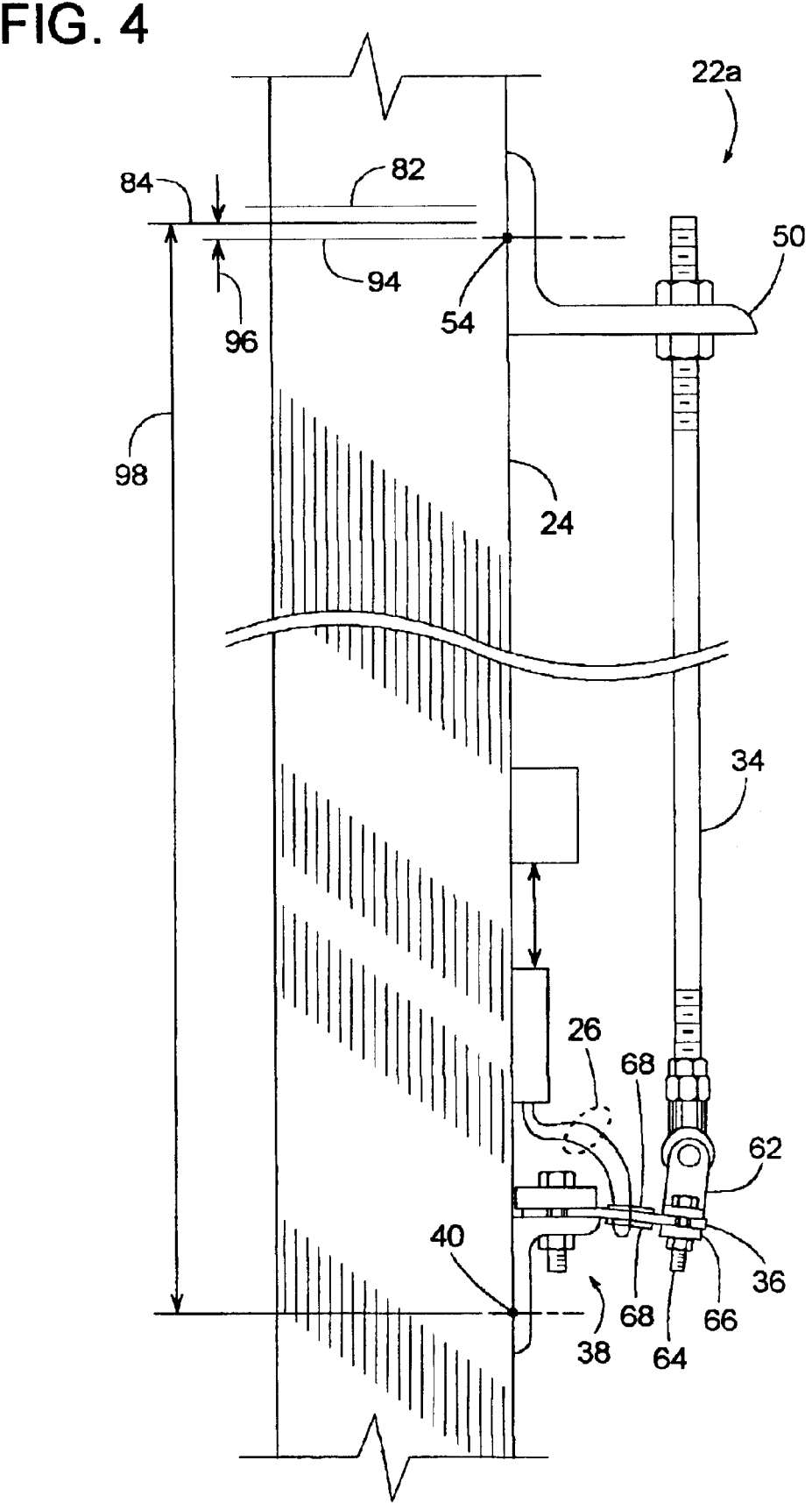
FIG. 4 is similar to FIG. 4 but with an external load applied to the derrick leg.

For example, FIGS. 2–4, show a strain gage apparatus 22a comprising an elongate member 34 that acts upon a reaction member 36. FIG. 2 shows apparatus 22a when load 16 equals zero, and FIG. 4 shows apparatus 22a when load 16 is appreciably greater than zero. Reaction member 36 can be a piece of spring steel approximately 0.5-inches wide, 2.5-inches long, and 0.020-inches thick. An anchor 38 attached to a first point 40 of derrick leg 24 holds one end of reaction member 36 substantially fixed. In this example, anchor 38 comprises an angle 42, a clamp plate 44, and two screws 46 that clamp one end of reaction member 36 between clamp plate 44 and angle 42. An attachment system 48 is schematically illustrated to represent any system that can attach anchor 38 to derrick leg 24. Examples of attachment system 48 include, but are not limited to, adhesives, welding, threaded fasteners, clamps, magnets, brazing, soldering, etc.

For apparatus 22a, elongate member 34 is a round rod threaded at each end, so its effective length can be adjusted. Lengthening elongate member 34 can increase the mechanical amplification or response of apparatus 22a, which will be explained further with reference to the embodiment of FIGS. 9 and 10. The rod may be less than 1-inch in diameter with a length of about 5-feet. An upper angle 50 connects a proximal end 52 of elongate member 34 to a second point 54 on derrick leg 24. An attachment system 56 is schematically illustrated to represent any system that can attach angle 50 to derrick leg 24. Examples of attachment system 56 include, but are not limited to, adhesives, welding, threaded fasteners, clamps, magnets, brazing, soldering, etc.

A ball joint rod end 58 (sometimes referred to as a rod bearing or a turnbuckle) connects a distal end 60 of elongate member 34 to a clevis 62 that two screws 64 connect to a clamp plate 66. Another end of reaction member 36 is clamped between clevis 62 and clamp plate 66. One or more strain gages 68 can be affixed to reaction member 36 to provide a load signal 26 to help determine the value of load 16 by sensing the strain in reaction member 36. Load signal 26 can be the electrical resistance or impedance of a single strain gage 68, or signal 26 can be a combined load signal, which is the combined electrical resistance of two strain gages 68. When two strain gages 68 are used, they are preferably attached to opposite faces of reaction member 36 and wired in series via wires 72, 74 and 76 so that their resistance values are added to each other to provide a combined load signal. The term, "strain gage" refers to a part having at least one electrical characteristic (e.g., electrical resistance) that varies upon distorting the part. Strain gage 68 can be a bending beam load cell (e.g., bending-full bridge strain gage SG-6/120-LY11) from Omega Engineering of Stamford Conn. Strain gages 68 can be wired to a conventional Wheatstone Bridge circuit 78, which in turn can be wired to a common electrical circuit 80, such as a personal computer, datalogger, digital display circuit, programmable logic controller, or the like. Circuit 80 then converts an output 82 of circuit 78 to a load value (e.g., the weight of load 16) that can be recorded or displayed. For greater sensitivity, circuits 78 or 80 may include a strain gage amplifier, such as an SGAMP-2 provided by Industrologic, Inc. of St. Charles, Mo., It should be appreciated by those skilled in the art of strain gage technology that various strain gages can be applied in various ways, and that there is a wide variety of circuitry available for interpreting the response of strain gages. A more important aspect of the invention is how an apparatus, such as apparatus 22a, can provide a strain gage mounting surface that for a given load change can experience a greater change in strain than an adjacent load bearing surface, such as the surface of derrick leg 24.

When derrick leg 24 is completely unloaded (i.e., load 16 is equal to zero and no derrick weight is applied to leg 24), the load strain or average load strain in derrick leg 24 may be substantially zero and point 54 may be at a level 82 relative to point 40. The weight of derrick 14 may create a load strain in derrick leg 24 as indicated by point 54 moving to level 84, whereby the load strain in leg 24 equals dimension 86 divided by dimension 88. Since the intent is to determine the value of load 16, the load strain caused by the weight of derrick 14 can be disregarded by way of an adjustment 90. In this embodiment, adjustment 90 varies the extent to which elongate member 34 deforms reaction member 36 by adjusting the axial position of nuts 92 on member 34, which in turn adjusts the effective length of member 34, so reaction member 36 is substantially unstressed. When reaction member is unstressed, its amplified strain is equal to zero. Thus, adjustment 90 can be used for zeroing strain gage apparatus 22a. The term, "amplified strain" simply refers to the strain in reaction member 36 as sensed by strain gage 68.

When load 16 is applied to derrick 14 (i.e., load 16 is appreciably greater than zero), derrick leg 24 experiences an increase in strain that results in point 54 moving from level 84 to a level 94, as shown in FIG. 4. This increase in strain is referred to as an average delta load strain, which equals dimension 96 divided by dimension 98. The movement of point 54 to level 94 pushes elongate member 34 downward, which bends reaction member 36 to create a delta amplified strain therein. The term, "delta amplified strain" refers to a change in the reaction member's strain in response to a change in the magnitude of load 16. The separation distance (e.g., distance 98) between points 40 and 54 should be sufficient to provide ample movement of distal end 60. In some cases, the distance between points 40 and 54 is about five feet. When distance 98 is sufficiently long, the delta amplified strain is greater than the average delta load strain, even though derrick leg 24 provides substantially more load support than reaction member 36. Reaction member 36 lies at an angle (i.e., not parallel) to the length of derrick leg 24 and preferably provides substantially no load support. The term, "substantially no load support" refers to supporting less than 0.001% of load 16. The delta amplified strain is communicated to Wheatstone Bridge circuit 78, which enables circuit 80 to record or display the value of load 16.

In another embodiment, shown in FIG. 5, a strain gage apparatus 22b is similar to apparatus 22a, except an elongate member 100 replaces member 34 and angle 50. Also, an angle 102 serves as a combination anchor and reaction member that replaces anchor 38 and reaction member 36. Attachment system 48 attaches angle 102 to a first point 104 of derrick leg 24, and one or more strain gages 106 are affixed directly to angle 102 to sense the strain therein. Attachment system 56 attaches a proximal end 108 of member 100 to a second point 110 of derrick leg 24, and a distal end 112 of member 100 engages angle 102. A sliding connection 114 (i.e., one member can translate relative to the other) exists between bar elongate member 100 and leg 24. An increase in load 16 can create a delta load strain between points 104 and 110 in leg 24, which causes elongate member 100 to push downward against angle 102. This bends the generally horizontal leg of angle 102 to create a delta amplified strain therein. Strain gage 106 responds to the delta amplified strain to help determine the value of load 16.

In another embodiment, shown in FIG. 6, a strain gage apparatus 22c is similar to apparatus 22a, except a cable 116 (an elongate member that is flexible) and an upper angle 118 replaces elongate member 34 and angle 50. Attachment system 48 attaches a lower angle 120 (combination anchor and reaction member) to a first point 122 on derrick leg 24, and one or more strain gages 124 are affixed directly to angle 120 to sense the strain therein. Attachment system 56 attaches upper angle 118 to a second point 126 of derrick leg 24. Eyebolts 128 can be adjusted to maintain tension in cable 116 at all times, so cable 116 applies a continuous upward bending moment on the generally horizontal leg of lower angle 120. An increase in load 16 can create a delta load strain between points 122 and 126 in leg 24, which reduces the tension in cable 116. Reducing the tension in cable 116 reduces the upward bending moment in angle 120, which in turn creates a delta amplified strain in angle 120. The delta amplified strain may vary inversely with load 16 but can still be used to help determine the value of load 16.

In another embodiment, shown in FIG. 7, a strain gage apparatus 22d is similar to apparatus 22a, except anchor 38 and reaction member 36 are replaced by the combination of an anchor 130, a reaction member 132 and a spacer 134. Reaction member 132 is a relatively thin strip of material (e.g., steel) that can be attached to anchor 130 and spacer 134 in any suitable manner, such as gluing, clamping, etc. One or more strain gages 136 can be affixed to reaction member 132 to sense the tensile strain therein. Attachment system 48 attaches anchor 130 to a first point 138 on derrick leg 24, and attachment system 56 attaches a proximal end 140 of an elongate member 142 to a second point 144 on leg 24. A distal end 146 of elongate member 142 connects to spacer 134 and the lower end of reaction member 132. An increase in load 16 can create a delta load strain between points 138 and 144 in leg 24, which causes elongate member 142 to move distal end 146 downward. This stretches reaction member 132 to create a delta amplified strain therein. Strain gage 136 responds to the delta amplified strain to help determine the value of load 16.

In another embodiment, shown in FIG. 8, a strain gage apparatus 22c includes an anchor 148 that attachment system 48 attaches to a first point 150 on derrick leg 24. Attachment system 56 attaches a proximal end 152 of an elongate member 154 to a second point 156 on derrick leg 24. A reaction member 158, similar to reaction member 36, has one end attached to a distal end 160 of elongate member 154. The opposite end of reaction member 158 engages the end of a screw 162 that serves as an adjustment for zeroing apparatus 22e. One or more strain gages 164 can be affixed to reaction member 158 for the usual purpose. A guide 166 attached to leg 24 helps guide a sliding connection between elongate member 154 and derrick leg 24. An increase in load 16 can create a delta load strain between points 150 and 156 in leg 24, which causes elongate member 154 to push reaction member 158 downward against screw 162. This bends reaction member 158 to create a delta amplified strain therein. Strain gage 164 responds to the delta amplified strain to help determine the value of load 16.

Figure 9:
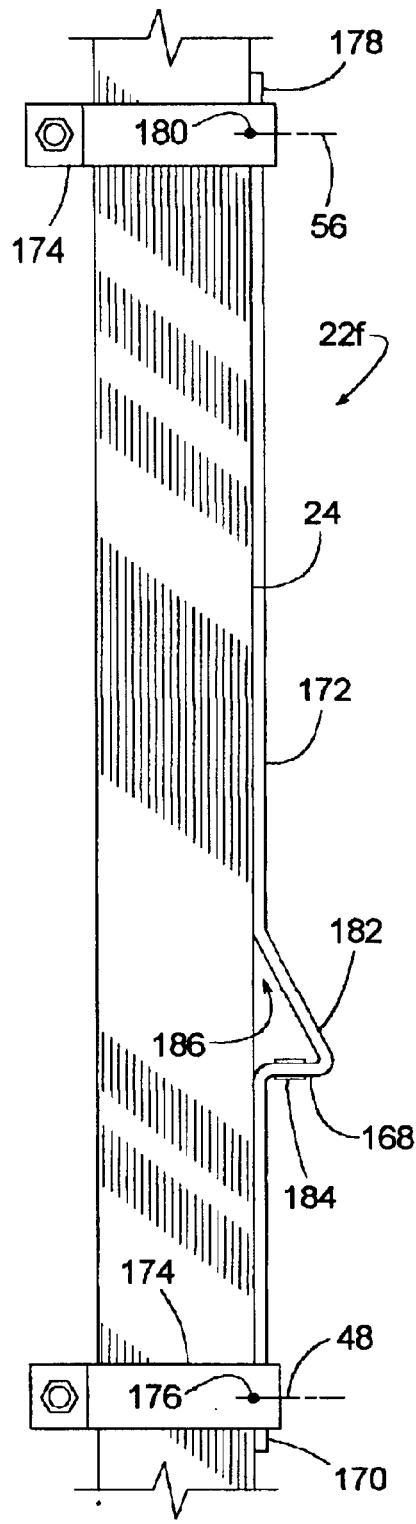
FIG. 9 is similar to FIG. 2 but showing another embodiment of a strain gage apparatus.
Figure 10:
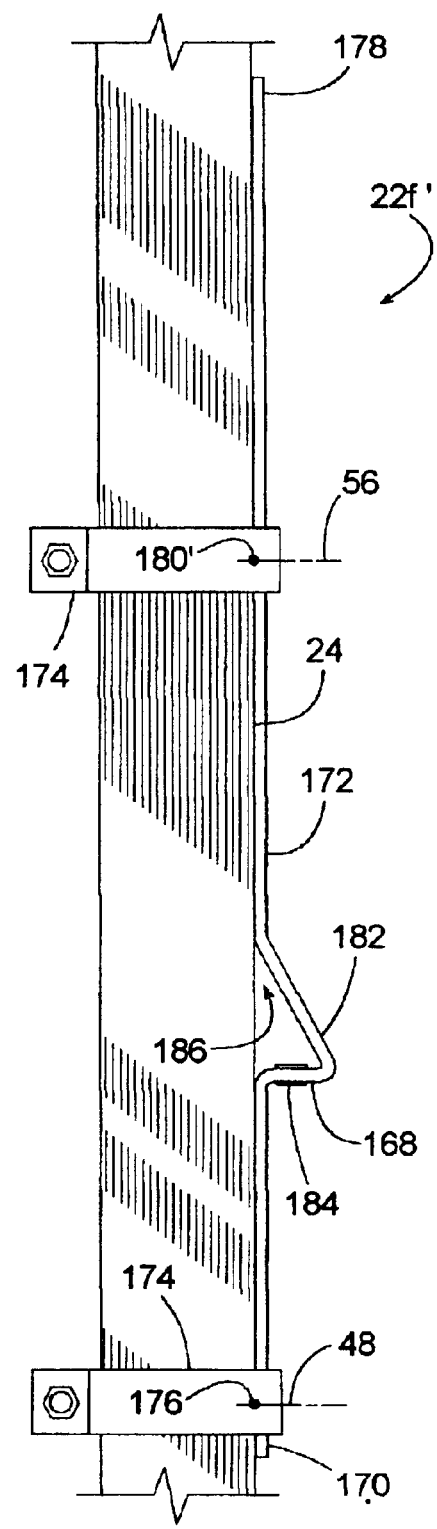
FIG. 10 is similar to FIG. 9 but with a clamp lowered to reduce the effective length of an elongate member.

In another embodiment, shown in FIG. 9, a strain gage apparatus 22f includes a single elongate unit formed to create in combination a reaction member 168, an anchor 170, and an elongate member 172. Attachment system 48, such as a clamp 174, attaches anchor 170 to a first point 176 on derrick leg 24. Attachment system 56, such as clamp 174, attaches a proximal end 178 of elongate member 172 to a second point 180 on leg 24. Reaction member 168 lies between anchor 170 and a distal end 182 of elongate member 172. One or more strain gages 184 can be affixed to reaction member 168 to sense deflection therein. A sliding connection 186 exists between elongate member 172 and leg 24. An increase in load 16 creates a delta load strain between points 176 and 180 in leg 24, which causes elongate member 172 to deflect reaction member 168. This creates a delta amplified strain in reaction member 168. Strain gage 184 responds to the delta amplified strain to help determine the value of load 16.

The strain in reaction member 168 is generally proportional to the length of elongate member 172 or the distance between points 176 and 180. Thus, adjusting the separation distance between clamps 174 adjusts the mechanical multiplying effect of apparatus 22f In FIG. 10, for example, the upper clamp 174 is moved to a point 180', so the two clamps 174 are closer to each other. For a given change in load, the delta amplified strain in apparatus 22f' of FIG. 10 will be less than the delta amplified strain in apparatus 22f of FIG. 9, wherein apparatuses 22f and 22f' are structurally the same except for the spacing of clamps 174. Apparatus 22f may be used on a derrick leg whose cross-sectional area is relatively large compared to its applied load whereas apparatus 22f' may be used on thinner derrick legs.

Figure 11:
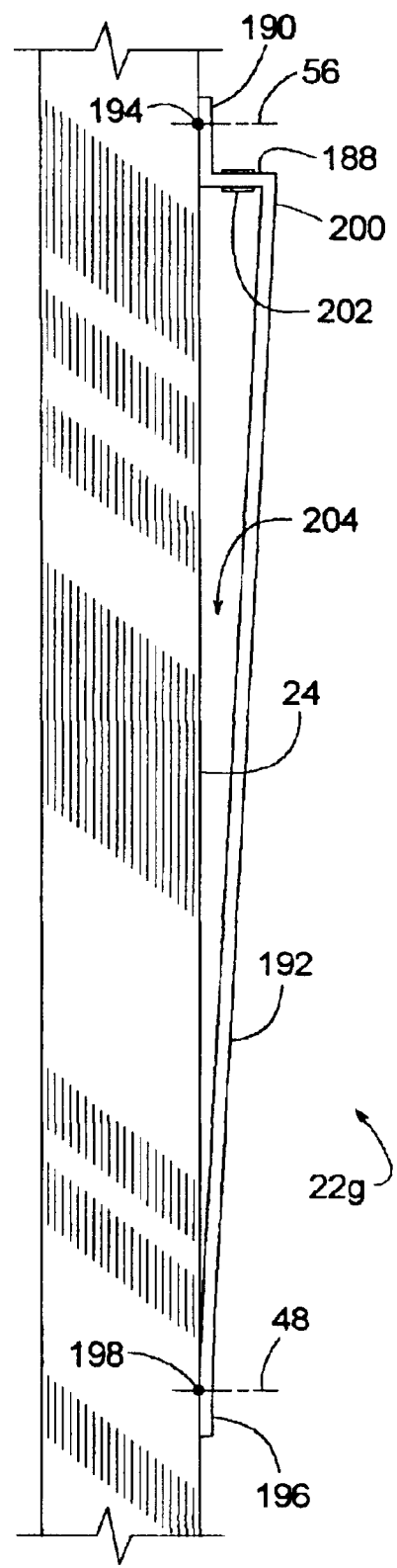
FIG. 11 is similar to FIG. 2 but showing another embodiment of a strain gage apparatus.

In another embodiment, shown in FIG. 11, a strain gage apparatus 22g includes a single elongate unit formed to create in combination a reaction member 188, an anchor 190, and an elongate member 192. Attachment system 56 attaches anchor 190 to a first point 194 on derrick leg 24. Attachment system 48 attaches a proximal end 196 of elongate member 192 to a second point 198 on leg 24. Reaction member 188 extends between anchor 190 and a distal end 200 of elongate member 192. One or more strain gages 202 can be affixed to reaction member 188 to sense deflection therein. A sliding connection 204 exists between elongate member 192 and leg 24. An increase in load 16 creates a delta load strain between points 194 and 198 in leg 24, which causes elongate member 192 to deflect reaction member 188. This creates a delta amplified strain in reaction member 188. Strain gage 202 responds to the delta amplified strain to help determine the value of load 16.

A strain gage apparatus 22h of FIGS. 12 and 13 is schematically illustrated to represent a broader, more generic application of the invention, wherein a load bearing member 24' is schematically illustrated to represent any member subjected to tension or compression. Examples of load bearing member 24' include, but are not limited to, a structural member of a crane, derrick leg, a portion of a road bridge, a hoist cable, guy wire, etc. In FIG. 12, strain gage apparatus 22h is shown in compression. And in FIG. 13, apparatus 22h is shown in tension.

Apparatus 22h includes an anchor 206 that attachment system 48 attaches to a first point 208 on load bearing member 24'. Attachment system 56 attaches a proximal end 210 of an elongate member 212 to a second point 214 on load bearing member 24'. A reaction member 216 is coupled between anchor 206 and a distal end 218 of elongate member 212. One or more strain gages 220 can be affixed to reaction member 216 for sensing the strain in reaction member 216 and ultimately determining compressive load 222 or tensile load 224. A change in load 222 or 224 can create a delta load strain between points 208 and 214 in load bearing member 24', which causes elongate member 212 to exert tension or compression on reaction member 216. This creates a delta amplified strain in reaction member 216. In response to the delta amplified strain, strain gage 220 provides a load signal 226 to help determine the value of load 222 or 224.

In FIG. 12, a delta load strain is load bearing member 24' is equal to the ratio of dimension 228 to dimension 230. Dimension 228 is the compression in load bearing member 24' caused by a change in load 222. Dimension 230 is the length between points 208 and 214 prior to the change in load 222. A change in strain in elongate member 212 is equal to the ratio of dimension 232 to dimension 234. Dimension 232 is the insignificantly slight compression that may occur in elongate member 212 caused by a change in load 222. Dimension 234 is the length of elongate member 212 prior to the change in load 222. For all practical purposes, elongate member 212 does not experience any appreciable change in length. A delta amplified strain in reaction member 216 is equal to the ratio of dimension 236 to dimension 238. Dimension 236 is the compression in reaction 216 caused by a change in load 222. Dimension 238 is the length of reaction member 216 prior to the change in load 222. In response to load 222 varying, elongate member 212 experiences a change in strain (approximately equal to zero) that is less than the delta load strain in load bearing member 24', and reaction member 216 experiences a delta amplified strain that is greater than the delta load strain.

In FIG. 13, the delta load strain is load bearing member 24' is equal to the ratio of dimension 240 to dimension 242. Dimension 240 is the stretch in load bearing member 24' caused by a change in load 224. Dimension 242 is the length between points 214 and 208 prior to the change in load 224. A change in strain in elongate member 212 is equal to the ratio of dimension 244 to dimension 246. Dimension 244 is the insignificantly slight stretch that may occur in elongate member 212 caused by a change in load 224. Dimension 246 is the length of elongate member 212 prior to the change in load 224. For practical purposes, elongate member 212 does not experience any appreciable change in length. The delta amplified strain in reaction member 216 is equal to the ratio of dimension 248 to dimension 250. Dimension 248 is the stretch in reaction 216 caused by a change in load 224. Dimension 250 is the length of reaction member 216 prior to the change in load 224. In response to load 224 varying, elongate member 212 experiences a change in strain that is less than the delta load strain in load bearing member 24', and reaction member 216 experiences a delta amplified strain that is greater than the delta load strain.

Although the invention is described with reference to a preferred embodiment, it should be appreciated by those skilled in the art that various modifications are well within the scope of the invention. For example, the physical orientation of any of the strain gage apparatuses just described can be inverted. It should be noted that although the various reaction members experience strain, the reaction member carries much less load than the load bearing member to which it is coupled. In many cases, the reaction member carries less than one percent or substantially none of the load. Therefore, the scope of the invention is to be determined by reference to the claims that follow.

I claim:

1. A strain gage apparatus responsive to a load that may vary, comprising:

a load bearing member subjected to the load; wherein in response to the load varying, the load bearing member experiences a first strain between a first point and a second point on the load bearing member; with the first point being spaced apart from the second point;

a reaction member coupled to the load bearing member, wherein the reaction member experiences a second strain that is greater than the first strain, yet the reaction member carries less of the load than does the load bearing member; and a strain gage disposed on the reaction member and responsive to the second strain, wherein the strain gage provides a load signal that varies with the load.

2. The strain gage apparatus of claim 1, wherein the reaction member carries less than one percent of the load.

3. The stain gage apparatus of claim 2, wherein the reaction member carries substantially none of the load.

4. A strain gage apparatus for a derrick suspending a load that may vary, comprising:

a derrick leg that helps support the load, wherein the derrick leg experiences an average delta load strain in response to the load varying;

a reaction member coupled to the derrick leg such the reaction member experiences a delta amplified strain caused by the load varying, wherein the reaction member provides less load support than the derrick leg, yet the delta amplified strain is greater than the average delta load strain; and a first strain gage disposed on the reaction member to sense the delta amplified strain and provide a load signal in response thereto, whereby the load signal varies with the load.

5. The strain gage apparatus of claim 4, wherein the reaction member provides substantially no load support.

6. The strain gage apparatus of claim 4, further comprising a second strain gage disposed on the reaction member, wherein the first strain gage and the second strain gage are on opposite faces of the reaction member and together provide a combined load signal that varies with the load.

7. The strain gage apparatus of claim 4, further comprising an elongate member having a proximal end attached to the derrick leg and a distal end engaging the reaction member, wherein the average delta load strain in the derrick leg creates relative movement between the distal end and the derrick leg, wherein the relative movement deforms the reaction member to create the delta amplified strain therein.

8. The stain gage apparatus of claim 7, wherein relative movement between the distal end and the derrick leg bends the reaction member.

9. The strain gage apparatus of claim 7, wherein the reaction member is thinner than the elongate member.

10. The strain gage apparatus of claim 7, wherein the reaction member extends between the derrick leg and the distal end such that the reaction member lies at an angle to the derrick leg.

11. The strain gage apparatus of claim 10, wherein the angle is substantially 90-degrees.

12. The strain gage apparatus of claim 7, further comprising a sliding connection between the derrick leg and the distal end of the elongate member.

13. The strain gage apparatus of claim 7, further comprising an adjustment engaging at least one of the elongate member and the reaction member to adjust the extent to which the elongate member deforms the reaction member.

14. A strain gage apparatus for a derrick that suspends a load that may vary, wherein the derrick includes a derrick leg subject to a load strain that varies due to changes in the load, the strain gage apparatus comprising:

an anchor being attachable to a first point on the derrick leg;

an elongate member having a proximal end and a distal end with the proximal end being attachable to a second point on the derrick leg, wherein a change in the load creates a change in the load strain, which moves the distal end relative to the anchor;

a reaction member disposed between the anchor and the distal end such the distal end and the anchor creates an amplified strain in the reaction member, and relative movement between the distal end and the anchor creates a change in the amplified strain that is greater than the change in the load strain for a given change in the load; and a first strain gage disposed on the reaction member, whereby the first strain gage provides a load signal that varies with the load.

15. The strain gage apparatus of claim 14, wherein the amplified strain is greater than the load strain.

16. The strain gage apparatus of claim 14, wherein the amplified strain is less than the load strain.

17. The strain gage apparatus of claim 14, further comprising a second strain gage disposed on the reaction member, wherein the first strain gage and the second strain gage are on opposite faces of the reaction member and together provide a combined load signal that varies with the load.

18. The strain gage apparatus of claim 14, wherein the reaction member is thinner than the elongate member.

19. The strain gage apparatus of claim 14, wherein the reaction member extending between the anchor and the distal end lies at an angle to the derrick leg.

20. The strain gage apparatus of claim 19, wherein the angle is substantially 90-degrees.

21. The strain gage apparatus of claim 14, further comprising a sliding connection between the anchor and the distal end of the elongate member.

22. The strain gage apparatus of claim 14, wherein relative movement between the distal end and the anchor causes the elongate member to deform the reaction member, and further comprising an adjustment engaging at least one of the elongate member and the reaction member to adjust the extent to which the elongate member deforms the reaction member.

23. A strain gage apparatus responsive to a load that may vary, comprising:

a load bearing member subjected to the load; wherein in response to the load varying, the load bearing member experiences a delta load strain between a first point and a second point on the load bearing member; with the first point being spaced apart from the second point;

an anchor connected to the load bearing member at the first point;

an elongate member connected to the load bearing member at the second point;

a reaction member coupled to the elongate member and the anchor; wherein in response to the load varying the elongate member experiences a change in strain that is less than the delta load strain, and the reaction member experiences a delta amplified strain that is greater than the delta load strain; and a strain gage disposed on the reaction member, whereby the strain gage provides a load signal that varies with the load.

24. The strain gage apparatus of claim 23, wherein the load bearing member is in tension.

25. The strain gage apparatus of claim 23, wherein the load bearing member is in compression.

26. The strain gage apparatus of claim 23, wherein the reaction member provides substantially no load support.

27. A strain gage apparatus for a derrick that suspends a load that may vary, wherein the derrick includes a derrick leg subject to a load strain that varies due to changes in the load, the strain gage apparatus comprising:

an anchor being attachable to a first point on the elongate member;

an elongate member having a proximal end and a distal end with the proximal end being attachable to a second point on the derrick leg, wherein a change in the load creates a change in the load strain, which moves the distal end relative to the anchor;

a reaction member disposed between the anchor and the distal end such that the reaction member lies at an angle to the structural member, the distal end and the anchor creates an amplified strain in the reaction member, and relative movement between the distal end and the anchor deflects the reaction member to create a change in the amplified strain that is greater than the change in the load strain for a given change in the load;

a first strain gage disposed on the reaction member, whereby the first strain gage provides a load signal that varies with the load; and an adjustment engaging at least one of the elongate member and the reaction member to adjust an extent to which the elongate member deflects the reaction member.

* * * * *